(12) United States Patent
Noble

(10) Patent No.: US 10,938,922 B2
(45) Date of Patent: Mar. 2, 2021

(54) CLOUD PLATFORMS, SERVICES, AND METHODS

(71) Applicant: Christopher Allen Noble, Jersey City, NJ (US)

(72) Inventor: Christopher Allen Noble, Jersey City, NJ (US)

(73) Assignee: Christopher Allen Noble, Jersey City, NJ (US)

( * ) Notice: Subject to any disclaimer, the term of this patent is extended or adjusted under 35 U.S.C. 154(b) by 0 days.

(21) Appl. No.: 16/374,227

(22) Filed: Apr. 3, 2019

(65) Prior Publication Data

US 2019/0312939 A1 Oct. 10, 2019

Related U.S. Application Data

(60) Provisional application No. 62/652,465, filed on Apr. 4, 2018.

(51) Int. Cl.
| | |
|---|---|
| *H04L 29/08* | (2006.01) |
| *H04L 9/32* | (2006.01) |
| *G06F 16/23* | (2019.01) |
| *G06F 21/60* | (2013.01) |

(52) U.S. Cl.
CPC ......... *H04L 67/16* (2013.01); *G06F 16/2365* (2019.01); *G06F 16/2379* (2019.01); *G06F 21/602* (2013.01); *H04L 9/3236* (2013.01); *H04L 67/1097* (2013.01)

(58) Field of Classification Search
CPC ... H04L 67/16; H04L 9/3236; H04L 67/1097; G06F 16/2379; G06F 16/2365; G06F 21/602
See application file for complete search history.

(56) References Cited

U.S. PATENT DOCUMENTS

| | | | |
|---|---|---|---|
| 2003/0007635 A1* | 1/2003 | Li | H04L 9/001 380/28 |
| 2010/0332818 A1 | 12/2010 | Prahlad et al. | |
| 2013/0185229 A1* | 7/2013 | Naga | G06F 3/067 705/418 |
| 2016/0048703 A1* | 2/2016 | Brandenburger | H04L 67/10 726/26 |
| 2017/0046806 A1 | 2/2017 | Haldenby et al. | |
| 2017/0277773 A1 | 9/2017 | Iasi et al. | |
| 2019/0045010 A1* | 2/2019 | Ha | H04L 67/1097 |
| 2019/0121799 A1* | 4/2019 | Hubbard | G06F 16/9537 |

FOREIGN PATENT DOCUMENTS

WO 2017153495 A1 9/2017

\* cited by examiner

*Primary Examiner* — Arvin Eskandarnia
(74) *Attorney, Agent, or Firm* — Troutman Pepper Hamilton Sanders LLP; Dustin B. Weeks; Brennan M. Carmody

(57) ABSTRACT

A cloud data management method comprising: receiving, from a first client device, client data for cloud storage; analyzing a first ledger to determine one or more acceptable cloud storage services from a plurality of cloud storage services; uploading, to the one or more acceptable cloud storage services, the client data; and updating the first ledger to include an indication of a location for the client data at the one or more acceptable cloud storage services.

20 Claims, 5 Drawing Sheets

300

CLOUD PLATFORMS, SERVICES, AND METHODS

CROSS-REFERENCE TO RELATED APPLICATIONS

This application claims the benefit of U.S. Provisional Application No. 62/652,465 filed Apr. 4, 2018, the entirety of which is incorporated herein by reference as if set forth in full below.

TECHNICAL FIELD

Aspects of the present disclosure relate generally to cloud databases, and more specifically to novel cloud platforms, services, and methods.

BACKGROUND

In the past, users would primarily use their personal computers to run programs, and store and manipulate data that was located on their local hard-drive. Today, more and more users are storing more and more data on remote data servers, and using cloud computing to manipulate and organize that data. Cloud computing involves the use of computing resources (hardware and software) that are delivered as a service over a network (typically the Internet). However, traditional cloud computing models have several disadvantages.

In the traditional approach, a client utilizes a single cloud platform to operate or run a particular application or database, and cloud service providers are economically motivated to assure clients are embedded and confined within their specific technology ecosystems. This reliance on a single provider can create liability for disaster recovery and business continuity. In other words, if the single provider becomes unavailable or their data becomes corrupted, the user would be unable to access their information. Additionally, clients cannot intuitively economically diversify by using and switching between multiple cloud service providers.

Moreover, data security can be a concern with cloud computing. As an initial matter, a user is traditionally reliant upon a third-party service provider to store and process its data. Thus, if the third-party is unscrupulous or the third-party is compromised, some or all of the data may be compromised, become corrupted, and/or lost. Additionally, users are reliant on third-party software and/or appliances for data security, integrity, disaster recovery, and/or business continuity.

Moreover, the physical resources in cloud servers may be shared by a plurality of consumers, cloud computing systems may use some form of resource sharing. For example, in some cloud computing models, consumers may share database resources. This can allow for possible exploitation from malicious entities.

Further, in the related art, cloud service providers typically have a pay model where uploading data is relatively inexpensive or free, while accessing or retrieving data can be costlier. These costs are often variable based on, for example, the time of day, the amount of data, and the location of data access (e.g., the cloud service providers data center(s) and/or server location). Additionally, these costs can vary among the several cloud services at a same time. Further, large data users can leverage their requirements to obtain and any contracted for discounts, but these discounts are not available to smaller entities needing smaller processing and storage capacities. Thus, the use of a single cloud-based network, especially by smaller users, is not necessarily most efficient, thus reducing entities of smaller size ability to compete and remain profitable and/or solvent over time.

Accordingly, there is a need for improved security, reliability, and cost effectiveness of cloud-based services. Therefore, certain aspects of the present disclosure address one or more of these issues.

SUMMARY

Disclosed embodiments provide systems and methods for data management and cloud platforms, services, and methods. According to some embodiments, there is provided a method including: receiving, from a first client device, client data for cloud storage; analyzing a first ledger to determine one or more acceptable cloud storage services from a plurality of cloud storage services; uploading, to the one or more acceptable cloud storage services, the client data; and updating the first ledger to include an indication of a location for the client data at the one or more acceptable cloud storage services.

The method may further include: receiving, from a second client device, a request to access the client data; analyzing a second ledger to determine a current optimal cloud storage service of the one or more acceptable cloud storage services; retrieving, from the current optimal cloud storage service, the client data based on the indication of the location for the client data; and outputting for transmission the client data to the second client device.

The method may further include: monitoring conditions of the one or more acceptable cloud storage services; and updating the second ledger based on the monitored conditions. The monitored conditions comprise at least one of current pricing for the one or more acceptable cloud storage services, current availability of the one or more acceptable cloud storage services, and current throughput of the one or more acceptable cloud storage services.

The method may further include: receiving, from a third client device, a new request to access the client data; analyzing the second ledger updated based on the monitored conditions to determine a new current optimal cloud storage service of the one or more acceptable cloud storage services; retrieving, from the new current optimal cloud storage service, the client data based on the indication of the location for the client data; and outputting for transmission the client data to the third client device.

The method may further include: hashing the client data received from the first client device to create a client data hash; storing the client data hash; and authenticating, prior to outputting the client data for transmission, the client data retrieved from the current optimal cloud storage service by: hashing the client data retrieved from the current optimal cloud storage service to create a retrieved data hash; and comparing the retrieved data hash to the client data hash.

The method may further include: determining, based on the authenticating, that the client data retrieved from the current optimal cloud storage service is potentially invalid; determining, based on the analyzing the second ledger, a next optimal cloud storage service of the one or more acceptable cloud storage services; retrieving, from the next optimal cloud storage service, the client data based on the indication of the location for the client data; and outputting for transmission the client data retrieved from the next optimal cloud storage service to the second client device.

The request to access the client data may indicate a type of service request. Determining the current optimal cloud storage service may be based on the type of service request.

The method may further include: receiving, from the second client device, an indication to persist changes to the client data; and updating the one or more acceptable cloud storage services to reflect the changes to the client data.

The first ledger may include client preferences for cloud storage service acceptability, the client preferences comprising at least one from among cost sensitivity, access speeds, data security, latency requirements, time-of-day requirements, service type, and service reliability.

Uploading the client data may include separating the client data into a plurality of data blocks, and uploading the plurality of data blocks to the one or more acceptable cloud storage services.

The method may further include uploading, to each of the one or more acceptable cloud storage services, a subset of the plurality of data blocks.

The method may further include: receiving, from a second client device, a request to access the client data; analyzing a second ledger to determine one or more current optimal cloud storage services of the one or more acceptable cloud storage services; retrieving, from each of at least two of the one or more current optimal cloud storage services, at least one data block of the plurality of data blocks to retrieve the plurality of data blocks based on the indication of the location for the client data; and outputting for transmission the client data to the second client device.

The client data may be received from the first client device having a primary encryption. The method may further include performing secondary encryption to the client data before uploading the client data to the one or more acceptable cloud storage services.

According to some embodiments, there is provided a data manager including: at least one processor; and at least one memory having stored thereon instructions that, when executed by the at least one processor, controls the at least one processor to: receive, from a first client device, client data for cloud storage; analyze a first ledger to determine one or more acceptable cloud storage services from a plurality of cloud storage services; upload, to the one or more acceptable cloud storage services, the client data; and update the first ledger to include an indication of a location for the client data at the one or more acceptable cloud storage services.

The instructions, when executed by the at least one processor, further controls the at least one processor to: receive, from a second client device, a request to access the client data; analyze a second ledger to determine a current optimal cloud storage service of the one or more acceptable cloud storage services; retrieve, from the current optimal cloud storage service, the client data based on the indication of the location for the client data; and output for transmission the client data to the second client device.

The instructions, when executed by the at least one processor, further controls the at least one processor to: monitor conditions of the one or more acceptable cloud storage services; update the second ledger based on the monitored conditions; and retrieve client data in accordance with subsequent requests based on the updated second ledger. The monitored conditions may include at least one of current pricing for the one or more acceptable cloud storage services, current availability of the one or more acceptable cloud storage services, and current throughput of the one or more acceptable cloud storage services.

The instructions, when executed by the at least one processor, further controls the at least one processor to: hash the client data received from the first client device to create a client data hash; store the client data hash; and authenticate, prior to outputting the client data for transmission, the client data retrieved from the current optimal cloud storage service by: hashing the client data retrieved from the current optimal cloud storage service to create a retrieved data hash; and comparing the retrieved data hash to the client data hash.

The instructions, when executed by the at least one processor, further controls the at least one processor to: determine, based on the authentication, that the client data retrieved from the current optimal cloud storage service is potentially invalid; determine, based on analyzing the second ledger, a next optimal cloud storage service of the one or more acceptable cloud storage services; retrieve, from the next optimal cloud storage service, the client data based on the indication of the location for the client data; and output for transmission the client data retrieved from the next optimal cloud storage service to the second client device.

The instructions, when executed by the at least one processor, further controls the at least one processor to: separate the client data into a plurality of data blocks; upload the plurality of data blocks to the one or more acceptable cloud storage services; receive, from a second client device, a request to access the client data; analyze a second ledger to determine one or more current optimal cloud storage services of the one or more acceptable cloud storage services; retrieve, from each of at least two of the one or more current optimal cloud storage services, at least one data block of the plurality of data blocks to retrieve the plurality of data blocks based on the indication of the location for the client data; and output for transmission the client data to the second client device.

According to some embodiments, there is provided non-transitory computer readable medium having stored thereon instructions for implementing a method comprising: receiving, from a first client device, client data for cloud storage; analyzing a first ledger to determine one or more acceptable cloud storage services from a plurality of cloud storage services; uploading, to the one or more acceptable cloud storage services, the client data; updating the first ledger to include an indication of a location for the client data at the one or more acceptable cloud storage services; receiving, from a second client device, a request to access the client data; analyzing a second ledger to determine a current optimal cloud storage service of the one or more acceptable cloud storage services; retrieving, from the current optimal cloud storage service, the client data based on the indication of the location for the client data; and outputting for transmission the client data to the second client device Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

The present disclosure can be understood more readily by reference to the following detailed description of one or more example embodiments and the examples included herein. It is to be understood that embodiments are not limited to the example embodiments described within this disclosure. Numerous modifications and variations therein will be apparent to those skilled in the art and remain within the scope of the disclosure. It is also to be understood that the terminology used herein is for describing specific example embodiments only and is not intended to be limiting. Some example embodiments of the disclosed technology will be described more fully hereinafter with reference to the accompanying drawings. The disclosed technology might be embodied in many different forms and should not be construed as limited to the example embodiments set forth herein.

The disclosed technology includes a data manager that provides enhanced functionality for cloud computing. In some cases, clients may interact with the data manager as if it were a traditional cloud service. However, the data manager leverages the capabilities of a plurality of cloud services to provide enhanced data security, speed, and cost effectiveness over the traditional approaches. In some implementations, the data manager may utilize a blockchain algorithm to map user's data between various cloud services and to select which cloud service to access for a particular request.

In some cases, the blockchain may be thought of as guiding or controlling how client data is transferred between clients and one or more cloud providers (e.g., cloud service providers or cloud services). The guidance may be based on, as non-limiting examples, client preferences and details, pointers to and logs of where data is stored and when it was accessed and/or modified (e.g., an access log and/or change log), and system-wide data points that govern what happens as conditions continually change (e.g., price changes, server outages, etc.). In some implementations, data sent between clients and cloud providers may be temporarily saved as nodes in the blockchain, but the blockchain may only permanently keep a ledger of where and when data was sent. In other words, in some cases, the blockchain's ledger provides information on the access (e.g., when and where different types of data were sent/received), but the actual data is not permanently stored within the blockchain. The blockchain may be thought of as storing where all the data is located, to whom the data belongs, and transfer protocols.

Figure 1:
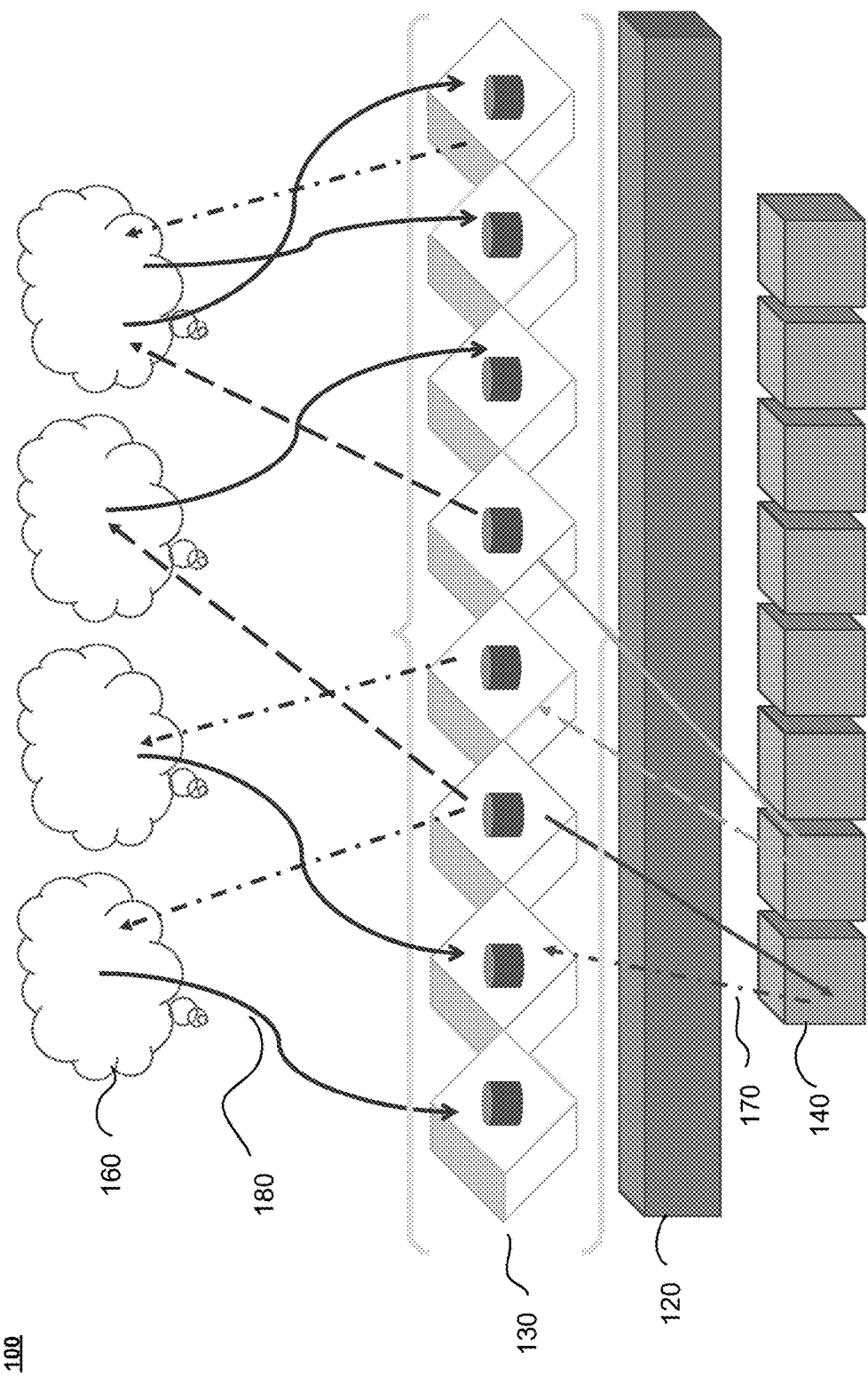
FIG. 1 illustrates an example environment for implementing certain aspects of the present disclosure.

FIG. 1 illustrates an example environment 100 for implementing certain aspects of the present disclosure. In the example environment 100, a plurality of clients 140 utilize a plurality of cloud services 160 through a single data manager 120. The clients 140 may be separate entities (e.g., companies), or related entities (e.g., coworkers with different authorizations). The cloud services 160 represent distinct cloud services. For example, the cloud services 160 may variously include Amazon Web Services, Google Cloud, and Microsoft AZURE. Data manager 120 may be embodied, for example, as a web service or portal. A client 140 may access data manager 120 and request access to various files 170. Data manager 120 may receive the requests from the client 140, retrieve portions of the data (i.e., data blocks 180) from one or more of the cloud services 160, and provide the retrieved portions to the client 140. By storing client data in multiple cloud services 160, data redundancy, back-up recovery and business continuity are improved. Furthermore, as non-limiting examples, this improvement may be increased as more nodes are added to the blockchain, the time each node has been "mining for security" on the blockchain. (e.g., as the "security mining" hash becomes more difficult over time), and the number of supported cloud services increases.

In certain embodiments, data manager 120 may utilize a private blockchain-based algorithm 130 to direct client's data and requests to the appropriate cloud service 160. For example, a blockchain node corresponding to a client 140 may set limits on which cloud services 160 to use, service requirements, and cost savings. As the client 140 accesses, adds, and modifies its data, the blockchain is updated to reflect these actions. Likewise, as service conditions change at the various cloud services 160, the blockchain adapts. In some implementations, as different clients 140 access, add, and modify their own respective data, the blockchain is further modified.

In some cases, the changing of the blockchain may be thought of as mining for security. As a non-limiting example, in some implementations multiple algorithms may be used for mining new blocks. In cases, the algorithms may be rotated (e.g., on cyclical, random, or pseudo-random bases) in order to prevent a single client or group of clients from "dominating" (owning a too high proportion of blockchain nodes (e.g., >50%)) the blockchain, e.g. enabling a single actor to unilaterally change the blockchain's ledger. The algorithms may be rotated to "fork" the blockchain from time-to-time. In some cases, additional or modified algorithms may be introduced into the rotation over time, and older algorithms may be retired and/or reintroduced. The blockchain may be resistant to Application Specific Integrated Circuits (ASIC) that may be designed to mine the blockchain implementing a particularly algorithm. For example, ASIC chips can sometimes perform over a billion times more hash calculations (e.g., terahashes (Th/s) compared to kilohash (kH/s)), in comparison to traditional CPU or GPUs. By forking the algorithm, particular ASIC chips are no longer applicable to the given blockchain algorithm.

In some embodiments, the blockchain may be "forked" to or from a software based algorithm. Additionally, in some embodiments, a software based algorithm may be used in conjunction with hardware based algorithms.

Additionally, in some cases, an equilibrium of "security token mining" may be moderated by limiting the processing power of a given node on the network. For example, to avoid exploitation from an entity (e.g., a tech-savvy person or client) with a large amount of processing power, hashes from a given node or client may be limited. For example, a certain number of "accepted hashes" (e.g., proof of work) may be allowed from a given node or group of nodes (e.g., a company), even one with heavy GPU processing capacity. In some cases, block ownership (e.g., awarded security tokens) can be adjusted as necessary to prevent "domination" by an entity. For example, security tokens may be assigned either 1) to the node that mined the token (e.g., solo mining), 2) based on an amount of effort performed by each node while mining (e.g., pool mining), or assignment by/to a blockchain manager in accordance with current blockchain status.

In some embodiments, the distribution of "security tokens" to each node may be known to all nodes. In such a case, each node owner can verify the distribution (e.g., ownership) of the blockchain to confirm that no single entity is able to unilaterally alter the ledger.

In some circumstances, only authenticated nodes may be able to "mine for security" upon the blockchain. Thus, in some implementation, only known nodes (e.g., not anonymous nodes) would be allowed on the blockchain. For example, in some cases, a client 140 must be authenticated to data manager 120 before transactions between the node and blockchain 130 are allowed. In some implementations, this authentication need only occur initially.

In certain embodiments, system integrity may be provided, at least in part, with three functions (e.g., 3D Security). First, only nodes (e.g., clients 140) authenticated to the data manager are allowed access blockchain 130. Second, only users authenticated to the authenticated nodes (e.g., users logged into client systems) are provided access to data storage nodes. Finally, the blockchain verifies the authenticity of any document retrieved from a cloud service 130 before sending it to the client 140. 3D Security is discussed in greater detail below with reference to FIG. 4.

In some cases, the use of a blockchain-based algorithm insulates client data from each different client 140 and from data manager 120. Thus, even if data manager 120 is compromised or experiences an outage, the customer data protocols remain secure within the blockchain security. In some circumstances, the clients 140 may store the blockchain ledger locally on their own hardware to enable greater control over access to this information. In certain cases, the information stored in the blockchain ledger may govern how the client data is transferred between a client 140 and cloud services 160. In some embodiments, portions of each client's data can be stored in one or more nodes in the blockchain. In some implementations, each client's data may be temporarily stored within the blockchain as it is transferred to or from a client 140. After the transfer is complete, the blockchain may maintain a record of the data access (e.g., what data was transferred and to where) but the client data may no longer be present in the blockchain.

In some circumstances, the client data may be stored and retrieved as data blocks 180 and not as contiguous files 170. Data manager 120 may retrieve blocks 180 for files 170 from one or more cloud services 160, combine the blocks 180 to compile files 170, and provide the compiled files 170 to the client 140. This arrangement further obfuscates the files 170 from malicious third-parties listening to or intercepting data going to or from individual cloud services 160. Moreover, by masking the data requests of an individual client 140 amongst a plurality of clients 140, it further be difficult for a malicious third-party to identify which data blocks belong to a given client.

In some implementations, one or more servers operated by the client 140 may be used to store portions of client data. For example, for security or legal reasons, a client may desire a certain set of documents stored on the client's own systems. Accordingly, the blockchain node corresponding to the client 140 may include some mappings to the client's own system for certain files and/or data blocks. For example, in some cases, the blockchain may consider portions of the individual client's system of as a cloud service 160.

In certain implementations, by obfuscating client usage patterns and/or through "mining" for security, processing patterns of clients 140 may not be easily detectable. Accordingly, client 140 data use may be protected from malicious third-parties and service providers. Additionally, the confidential information of clients, operating models, business process, and trade secrets may be obfuscated or in other ways obscured from being analyzed by cloud service providers.

In some embodiments, multiple blockchains may be utilized. For example, a commonly owned blockchain may store guidance information to determine which cloud service 160 should be utilized for a given data request. This first blockchain may be communally owned by clients 140 and the data manager 120. Secondary blockchains (e.g., client data chains) may contain the necessary pointers to client data or data blocks associated with a particular client 140. These secondary blockchains may be owned exclusively by one or more clients 140 (e.g., one or more devices or servers controlled by a single client 140 or multiple clients 140) or be jointly owned with data manager 120.

Figure 2:
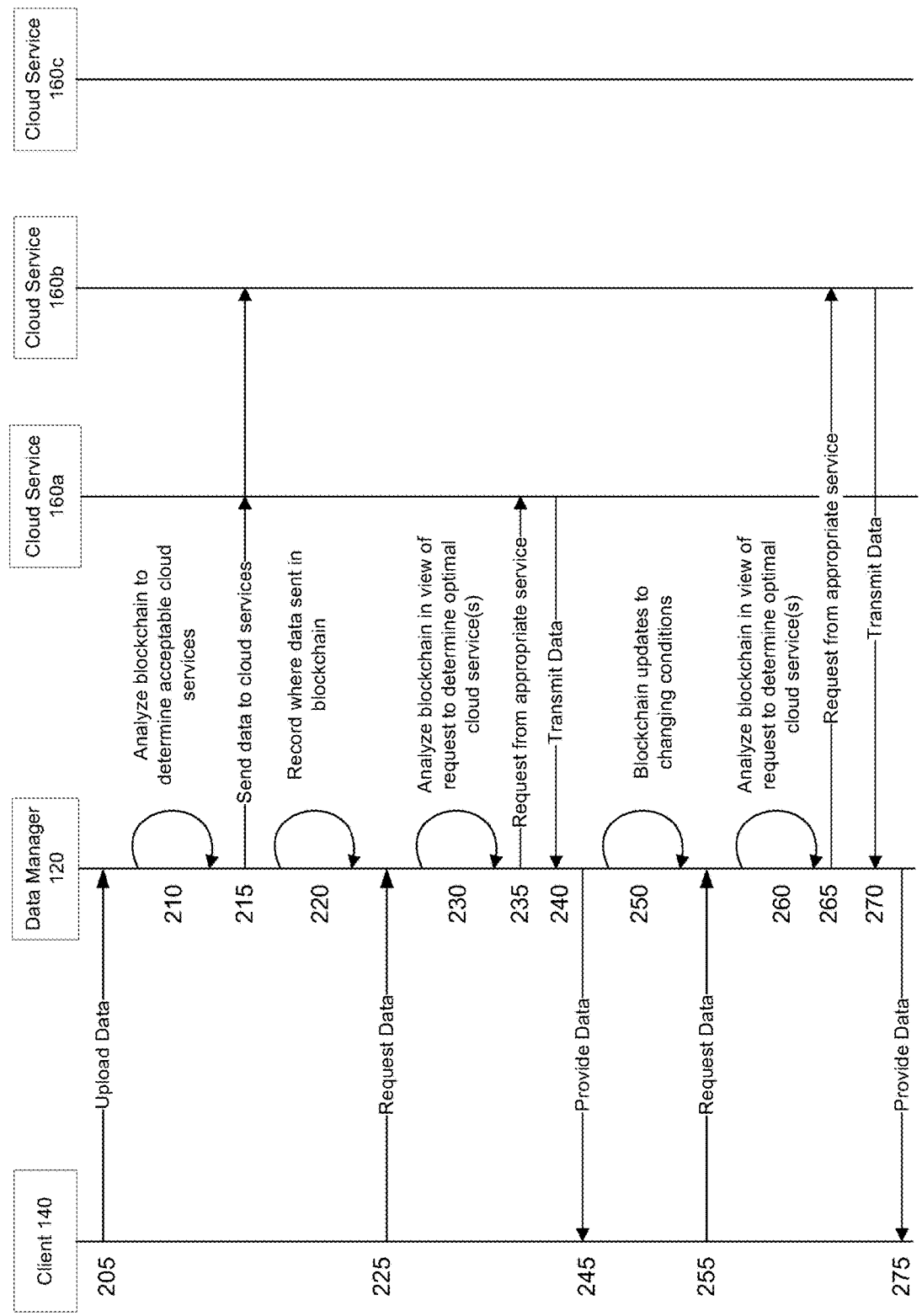
FIG. 2 is a timing diagram illustrating data flow according to an example embodiment.

FIG. 2 is a timing diagram illustrating data flow 200 according to an example embodiment. At 205, client device 140 uploads data through data manager 120. At 210, data manager 120 analyzes the blockchain 130 node corresponding to the client device 140 to determine which cloud services 160*a*-160*c* are acceptable to store the data. The determination as to whether particular cloud services 160*a*-160*c* are acceptable can be based on a number of factors, including, but not limited to, cost thresholds, bandwidth/speed thresholds, security requirements, other needs of the client 140, and the like. In some cases, a user or administrator for the client device 140 may select appropriate cloud services 160 before-hand. At 215, because data manager 120 determined cloud services 160*a* and 160*b* are acceptable (e.g., are acceptable cloud storage services), data manager 120 directs the client data to cloud services 160*a* and 160*b* but not cloud service 160*c*. In some cases, data ingress (i.e., uploading data to a cloud service) is relatively inexpensive. Accordingly, client data will be sent to all cloud services to ensure data integrity and continuity of service (i.e., client data is both backed up in several places and an accessed cloud service 160 may be changed in real-time). Data manager 120 updates the blockchain 130 to track where data is sent for client device 140.

At 225, the client device requests data through data manager 120. At 230, data manager 130 analyzes the current status of the blockchain 130 in light of the request to determine optimal cloud service(s) 160 for retrieving the requested data. The determination of from which cloud service(s) 160 the requested data should be retrieved can take into consideration one or more factors, including, but not limited to, which cloud services 160*a*-160*c* are compatible with the client 140 (e.g., according to client preferences), the request (e.g., type of service requested), which cloud services 160*a*-160*c* have data available, which cloud services 160*a*-160*c* are the most cost efficient (in which costs can vary depending on time of day, geographic location, etc.), latency requirements (e.g., tiers of latency), cloud service compatibility or preference, and the like. For example, with regards to latency, a client 140 may classify different types of data as requiring different tiers of latency, e.g. critical data may be in tier 1 requiring very little latency, whereas archived files may be in tier 4 where greater latency is acceptable. In such a situation, data manager 120 can determine the cloud service 160 capable of providing egress for the data to a client 140 meeting the latency tier requirement at the lowest cost. Having determined cloud service 160*a* is currently optimal for the request, at 235, data manager 120 requests client data from cloud service 160*a*.

A non-limiting list of potential factors affecting cloud service prices, performance, and/or selection are provided below in Table 1.

TABLE 1

Example Selection Factors

| Type | Examples |
|---|---|
| Environmental | Disasters - floods, tornados, hurricanes, cyclones, earthquakes, mudslides, sinkholes, volcanoes, droughts, fires, blizzards, snow, ice, wind, solar winds, solar storms, meteors, acid rain, hail, storm surge, tsunami, nuclear meltdown<br>Long-term - sea rise, changing likelihood of disasters, climate change, opening of new trade routes, scarcity of potable water, sea salinity, changing growing seasons and locals, overpopulation<br>Resource availability - changing supply of electricity or fossil fuels affecting prices |
| Regulatory | Changing taxes, subsidies, quotas, restrictions, bans, interest rates<br>Regulations change faster right after elections, and uncertainty in future changes highest just before elections |
| Geopolitical | Wars, sanctions, trade agreements, cyberattacks, terrorism, etc. |
| Technological | New computer chips, energy sources, compilation algorithms, hardware, software, circuitry, applications |
| Psychological | Changing levels of confidence and fear affect pricing, buying habits, saving/spending habits |
| Markets | Consumer price indexes, market trends, historical data, stock trends, durable goods orders, unemployment rates, consumer confidence indexes, federal reserve rates, discount window rates, commodities |
| Cost of Capital | LIBOR, Treasury Constant Maturities, weighted average cost of capital (WACC) indexes |
| Competition | Competitors - New competitors entering cloud service space, mergers, acquisitions<br>Sales - one competitor changes prices, others react with their own changes |
| Security | Threats, attacks, or vulnerability to cybersecurity or physical security of server farms |
| Time | Time of day - higher demand during work hours of developed nations<br>Time of month/quarter/year - end of month often higher demand for many firms |

At 240, cloud service 160a transmits the requested data to data manager 120, which then provides the data to client device 140 at 245. At 250, data manager 120 updates the blockchain 130 based on changing conditions (e.g., relative price or latency of cloud services 160a-160c).

At 255, the client device again requests data through data manager 120. At 260, data manager 130 analyzes the current status of the blockchain 130 in light of the request to determine optimal cloud service(s) 160 for retrieving the requested data. Because conditions changed, e.g., latency, costs, a particular cloud service is unavailable, etc., data manager 120 now determines that cloud service 160b is currently optimal for the request, and, at 265, requests client data from cloud service 160b. At 270, cloud service 160b transmits the requested data to data manager 120, which then provides the data to client device 140 at 275.

As discussed above, data manager 130 may determine which cloud services 160a-160c are compatible with the data request from client device 140. In some instances, a number of client preferences may be embedded within a blockchain algorithm to guide this selection (e.g., guarantee quality of service). These client preferences may include latency requirements, time-of-day requirements, cloud services requirements, and security requirements. The client preferences can vary by client or even by specific types of data or intended uses of specific data for a given client.

In some cases, the latency requirements may reflect the type of data access intended by the client device 140. Latency may be affected by a variety of factors including time of day (e.g., load on client service 160), available bandwidth, size of data request, speed of connection, and location. In some cases, different datasets from/to a same client device 140 may include different latency requirements. In some cases, different latency requirements may be reflected as tiers, for example, as depicted below in Table 2.

TABLE 2

Latency Requirements

| Tier | Latency Required |
|---|---|
| 1 | Fastest; critical; downtown and lag unacceptable |
| 2 | Important; some lag acceptable |
| 3 | Backup files; speed flexible; not always in use |
| 4 | Archive-type data |

Time of day requirements may reflect the expected time of access of the data. In many cases, cloud service load is highest during standard working hours (e.g., 9-5) and at specific points in a cycle (e.g., before payroll processing). Accordingly, cloud services 160 may charge higher rates during these times, and offer discounted rates when usage is lower. For example, the busiest moments of day, week, and month provide less price flexibility. However, if a client device 140 may access data during times of less usage (e.g., nights and weekends), more price flexibility is generally available. For example, for certain types of data or processes may be able to be run asynchronously as the data is not time-sensitive. For example, archiving data may generally be done at more cost-effective times. Meanwhile, for certain other types of data or processes, minimal latency may be required, minimizing flexibility.

Cloud services requirements indicates the types of cloud service 160 that the client device 140 is likely to use. As non-limiting examples, cloud services 160 may provide Infrastructure-as-a-Service (IaaS), Platform-as-a-Service (PaaS), Software-as-a-Service (SaaS), and standard database functionality (e.g., SQL interfaces). Different cloud services 160 may be more able or cost efficient in providing different types of services. In some cases, client devices 140 may utilize different services for different data requests or within a same data request.

Security requirements refers to whether data security should be weighted in selecting one or more cloud services 160. For example, as discussed above, client data may be stored and retrieved as data blocks 180 and not as contiguous files 170. Data manager 120 may retrieve different data blocks 180 for files 170 from different cloud services 160 (as opposed to all data blocks 180 from the optimal cloud service 160) and combine the blocks 180 to generate the files 170. This arrangement may secure client data as no compromise of the data processing or communication of a single cloud service 160 will compromise an entire client file 170.

In some cases, a client 140 may encrypt its data before sending it to the data manager 120 for upload. Similarly, the client 140 will decrypt its data after being retrieved through the data manager 120. In some instances, the data manager 120 may secondarily encrypt data blocks or files before uploading the same to one or more cloud services 160, and secondarily decrypt the data blocks or filed before delivering them to the client 140.

Figure 3:
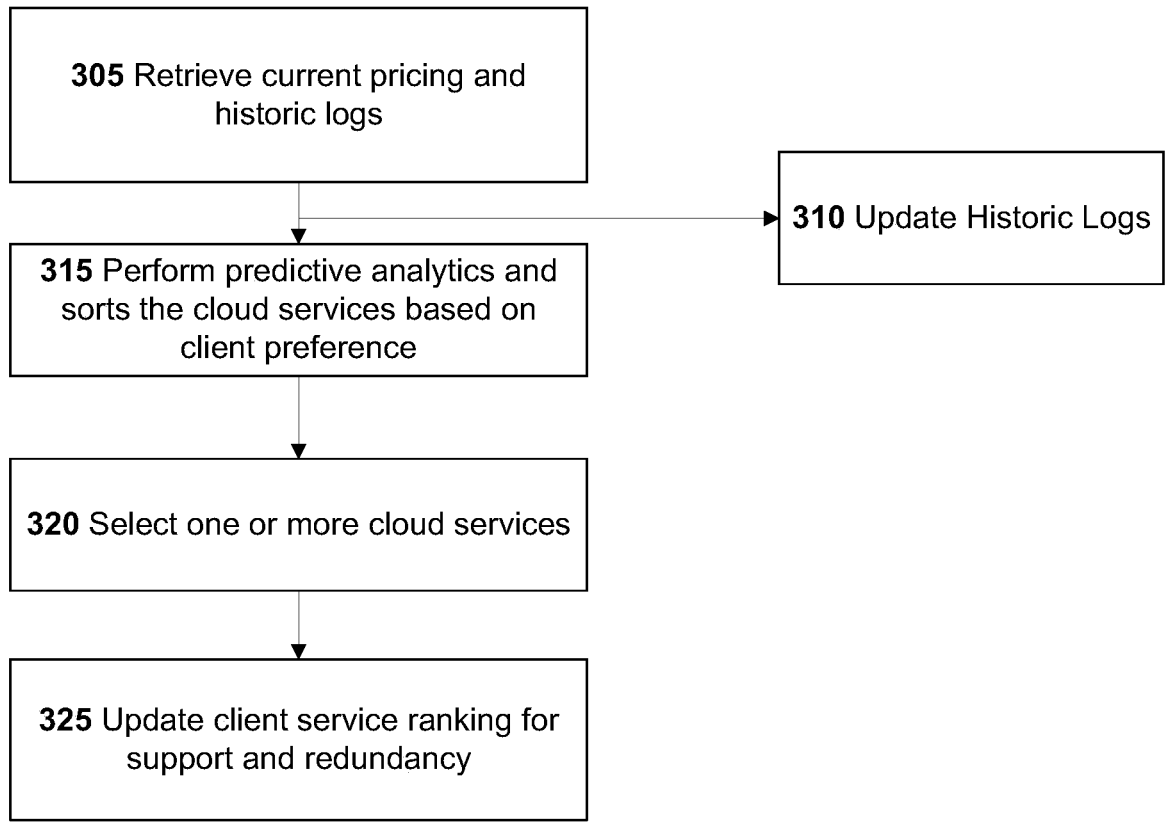
FIG. 3 is a flowchart of a method of selecting an optimal cloud service according to an example embodiment.

FIG. 3 is a flowchart of a method 300 of selecting an optimal cloud service 160 according to an example embodiment. At 305, data manager 120 retrieves current pricing and historic logs (e.g., historic pricing and latency for particular days, times, and locations) for the various cloud services 160. In certain instances, the data manager 120 may monitor performance of the various client services 160 over time. This performance monitoring may be used to develop or enhance the historic logs. For example, data manager 120 can consider historic and current pricing and predict future trends for pricing. At 310, data manager 120 updates the historic logs based on the current pricing. At 315, data manager 120 performs predictive analytics and sorts the cloud services based on client preferences. In some cases, data manager 120 may consider a location (e.g., server site) of various cloud services 160. For example, based on preferences, some clients 140 will accept higher latencies at lower use periods to take advantage of cheaper prices from distantly hosted cloud services 160 (e.g., cloud services hosted in other continents or parts of the world). In some instances, the algorithms may take into account external data (e.g., power outages, weather issues) that may affect the performance of certain client services 160. At 320, data manager 120 selects one or more client services 160 based on the sorting, and, at 325, update a client service ranking for client support and data redundancy.

In some cases, the data management allows scaling benefits. For example, the more cloud services 160 available, the more pricing options and optimizations are available. Similarly, the more cloud service locations (e.g., geographic hosting locations) accessible by the data manager 120, the more opportunities presented for reduced pricing. Meanwhile, as the number of clients 140 increases, data usage (and data usage guarantees) likewise increases. Accordingly, data manager 120 may leverage this increase to acquire reduced pricing.

Figure 4:
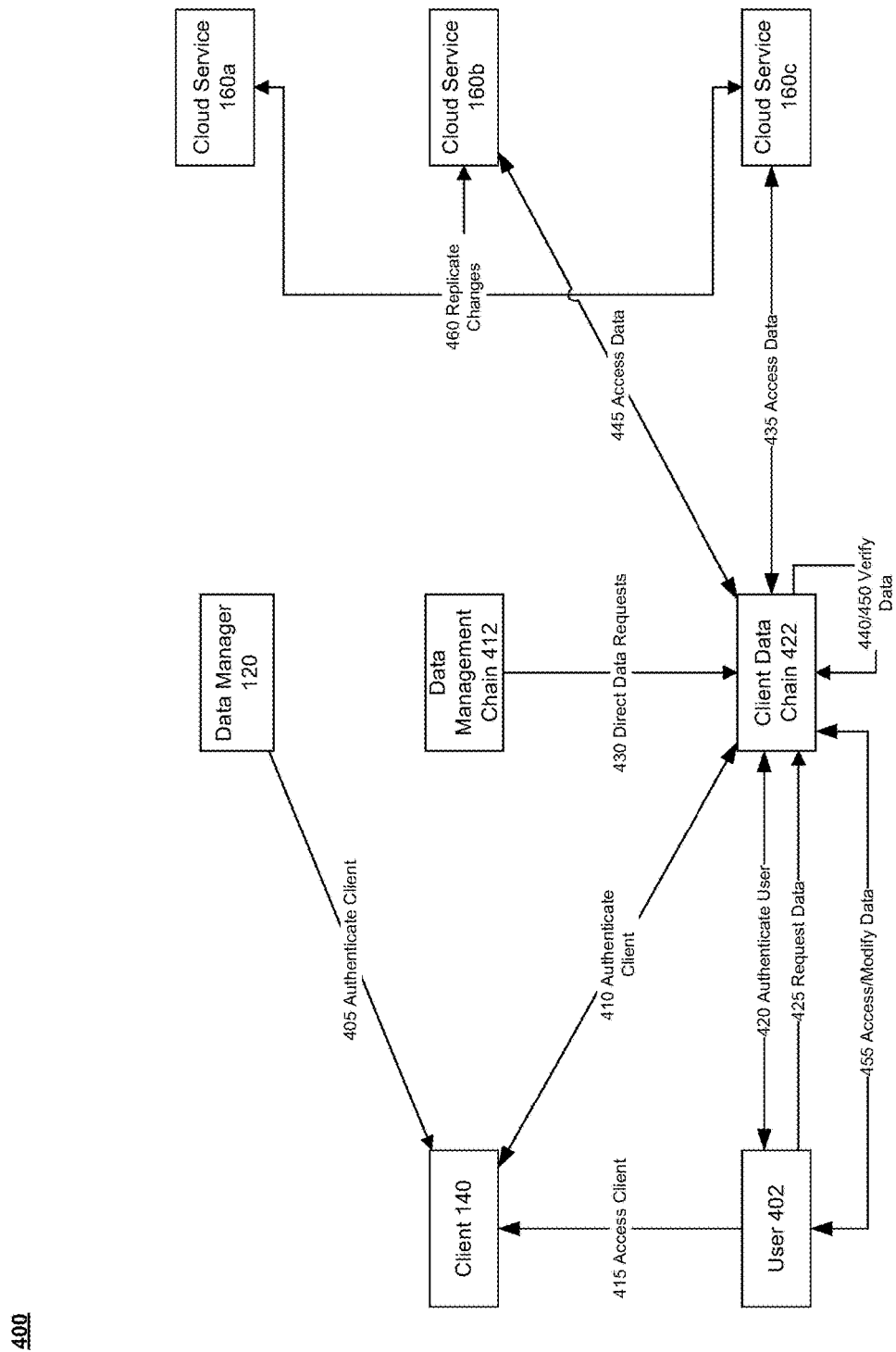
FIG. 4 is a flow diagram of certain security features provided by some embodiments of the present disclosure.

FIG. 4 is an example flow diagram 400 of certain security features provided by some embodiments of the present disclosure. One of ordinary skill will understand that the security features (e.g., 3D Security) described herein is merely an example, and various changes, modifications, and additions may be made without departing from the scope of the present disclosure.

Referring to FIG. 4, at 405 a client 140 authenticates with the data manager 120. For example, the client 140 may be a server that must verify its identify with the data manager 120 once (e.g., initially becoming a node), periodically (e.g., every week), or upon request (e.g., if a breach is suspected). The authentication authorizes the client 140 to communicate with the data management chain 412. As a non-limiting example, the data management chain 412 may include some or all of the logic necessary to select between a plurality of cloud services 160.

At 410, the client 140 authenticates with client data chain 422. As a non-limiting example, client data chain 422 may include the necessary information to identify the location of specific data (e.g., files, documents) within the one or more cloud services 160. In some implementations, only a client 140 authenticated with the data manager 120 may authenticate with the client data chain 422. For example, data manager 120 may share a secret with client 140 and client data chain 422. Client 140 may share the secret with client data chain 422, which compares the secret with secret from the data manager 120.

At 415 the user 402 accesses the client 140. For example, the user 402 may enter login credentials (e.g., username and password) to access the client 140. In some cases, client 140 may be a server, and the user 402 may access the server through a computer device. At 420, the user 402 authenticates with the client data chain 422, e.g., through client 140. After authentication, the user 402 requests data from the client data chain 422.

At 430, the data management chain 412 guides the client data chain 422 in selecting a particular cloud service 160 for the user 402 data request. For example, data management chain 412 may guide a user 402 data request based on current or predicted pricing (see, e.g., FIG. 3).

At 435, client data chain 422 retrieves client data from a best cloud service 160 (e.g., cloud service 160*c*) as directed by the data management chain 412. At 440, the client data chain 422 verifies the client data from cloud service 160*c*. As a non-limiting example, client data chain 422 may maintain hashes of client data, calculate hashes of the data retrieved from cloud service 160*c*, and compare the maintained hash to the calculated hash to verify the data. If the data from cloud service 160*c* is not verified, at 445 client data chain 422 may retrieve data from a next best cloud service 160 (e.g., cloud service 160*b*) as directed by the data management chain 422. At 450, the client data chain 422 verifies the client data from cloud service 160*b*.

Once the data is verified, at 455, the client data chain 422 provides the data to the client 402. The client 402 may then modify the data. When changes to the client data are saved, at 460, the changes are replicated across the cloud service 160*a*-160*c*. In some cases, only differentials (e.g., differences between the original and modified files) are replicated across the cloud services 160*a*-160*c*.

Figure 5:
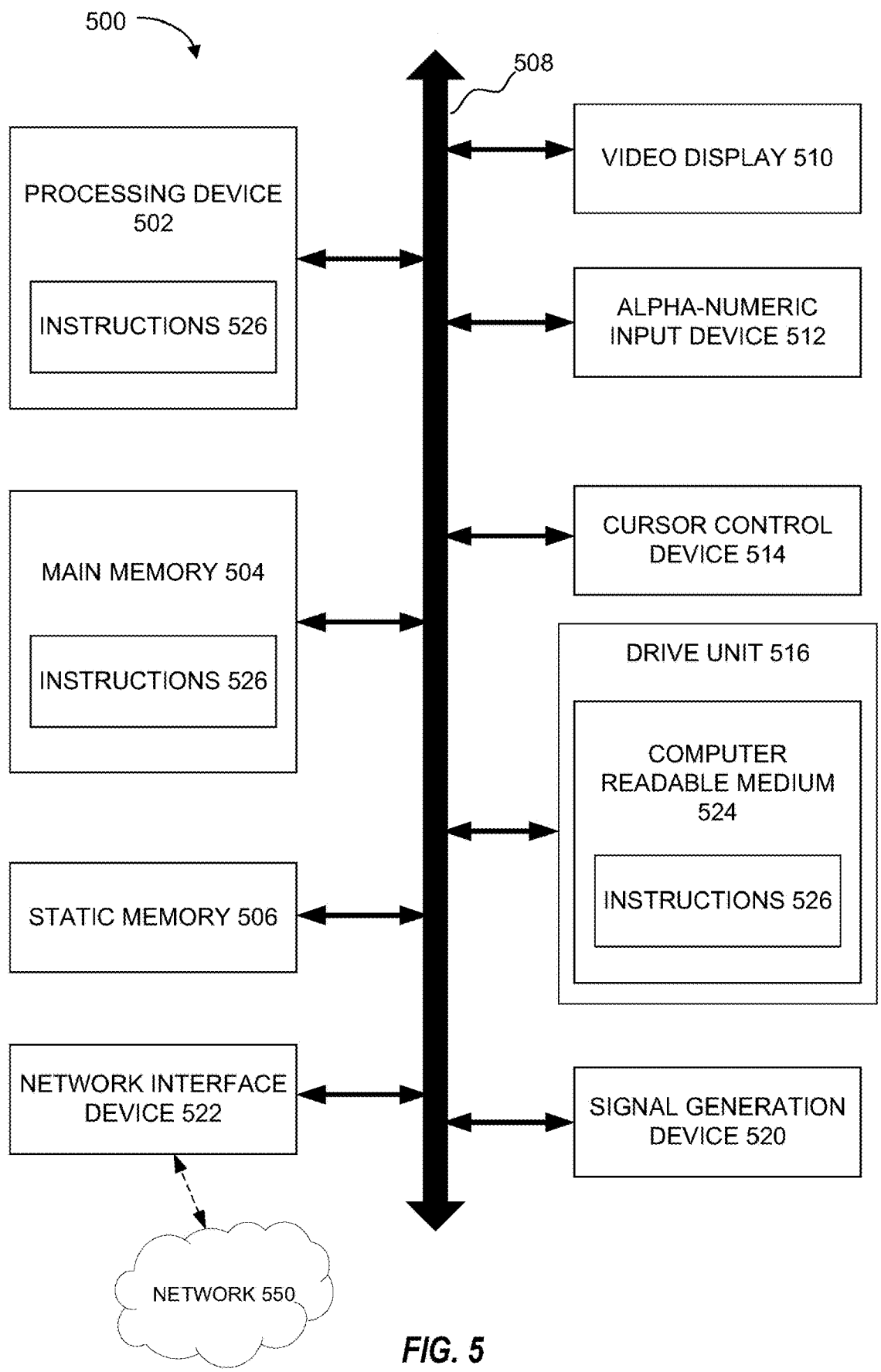
FIG. 5 is a block diagram of example computer system that may implement certain aspects of the present disclosure.

FIG. 5 is a block diagram of example computer system 500 that may implement certain aspects of the present disclosure. In some cases, one or more of data manager 120, the client devices 140, and/or the cloud services 160 may be implemented using one or more computer systems 500. However, one of ordinary skill will recognize that this is merely an example, and various alterations, reductions, or additions may be made to some the computer system 500 without departing from the scope of the present disclosure. The computer system 500 may include a set of instructions 526 for controlling operation of the computer system 500. In some implementations, the computer system 500 may be connected (e.g., networked) to other machines in a Local Area Network (LAN), an intranet, an extranet, a satellite communications system, or the Internet. The computer system 500 may operate in the capacity of a server or a client machine in a client-server network environment, or as a peer machine in a peer-to-peer (or distributed) network environment. The computer system 500 may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single computer system 500 is illustrated, the term "machine" shall also be taken to include any collection of machines (e.g., computers) that individually or jointly execute a set (or multiple sets) of instructions to perform any one or more of the methodologies discussed herein.

The computer system 500 includes a processing device 502, a main memory 504 (e.g., read-only memory (ROM), flash memory, dynamic random-access memory (DRAM) such as synchronous DRAM (SDRAM), etc.), a static memory 506 (e.g., flash memory, static random-access memory (SRAM), etc.), and a secondary memory 516 (e.g., a data storage device), which communicate with each other via a bus 508.

The processing device 502 represents one or more general-purpose processing devices such as a microprocessor, a microcontroller, a central processing unit, or the like. As non-limiting examples, the processing device 502 may be a reduced instruction set computing (RISC) microcontroller, a complex instruction set computing (CISC) microprocessor, a RISC microprocessor, very long instruction word (VLIW) microprocessor, a processor implementing other instruction sets, or one or more processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute the operations for electronically creating and trading derivative products based on one or more indices relating to volatility.

The computer system 500 may further include a network interface device 522. The computer system 500 also may include a video display unit 510, i.e., a display (e.g., a liquid crystal display (LCD), a touch screen, or a cathode ray tube (CRT)), an alphanumeric input device 512 (e.g., a keyboard), a cursor control device 514 (e.g., a mouse), and a signal generation device 520 (e.g., a speaker).

The secondary memory 516 may include a non-transitory storage medium 524 on which is stored one or more sets of instructions 526 for the computer system 500 representing any one or more of the methodologies or functions described herein. For example, the instructions 526 may include instructions for implementing an asset tracking device including a power source and power management system or subsystem for a container or a trailer. The instructions 526 for the computer system 500 may also reside, completely or at least partially, within the main memory 504 and/or within the processing device 502 during execution thereof by the computer system 500, the main memory 504 and the processing device 502 also constituting computer-readable storage media.

While the storage medium 524 is shown in an example to be a single medium, the term "storage medium" should be taken to include a single medium or multiple media that store the one or more sets of instructions for a processing device. The term "storage medium" shall also be taken to include any medium that is capable of storing or encoding a set of instructions for execution by the machine that cause the machine to perform any one or more of the methodologies of the disclosure. The term "storage medium" shall accordingly be taken to include, but not be limited to, solid-state memories, and optical and magnetic media.

An embodiment of the present disclosure may be implemented according to at least the following:

Clause 1: A cloud data management method comprising: receiving, from a first client device, client data for cloud storage; analyzing a first ledger to determine one or more acceptable cloud storage services from a plurality of cloud storage services; uploading, to the one or more acceptable cloud storage services, the client data; and updating the first ledger to include an indication of a location for the client data at the one or more acceptable cloud storage services.

Clause 2: The method of clause 1 further comprising: receiving, from a second client device, a request to access the client data; analyzing a second ledger to determine a current optimal cloud storage service of the one or more acceptable cloud storage services; retrieving, from the current optimal cloud storage service, the client data based on the indication of the location for the client data; and outputting for transmission the client data to the second client device.

Clause 3: The method of clause 2 further comprising: monitoring conditions of the one or more acceptable cloud storage services; and updating the second ledger based on the monitored conditions.

Clause 4: The method of clause 3 further comprising: receiving, from a third client device, a new request to access the client data; analyzing the second ledger updated based on the monitored conditions to determine a new current optimal cloud storage service of the one or more acceptable cloud storage services; retrieving, from the new current optimal cloud storage service, the client data based on the indication of the location for the client data; and outputting for transmission the client data to the third client device.

Clause 5: The method of any of clauses 3 or 4, wherein the monitored conditions comprise at least one of current pricing for the one or more acceptable cloud storage services, current availability of the one or more acceptable cloud storage services, and current throughput of the one or more acceptable cloud storage services.

Clause 6: The method of any of clauses 2-5 further comprising authenticating, prior to outputting the client data for transmission, the client data retrieved from the current optimal cloud storage service.

Clause 7: The method of clause 6, further comprising: hashing the client data received from the first client device to create a client data hash; and storing the client data hash, wherein the authenticating comprises: hashing the client data retrieved from the current optimal cloud storage service to create a retrieved data hash; and comparing the retrieved data hash to the client data hash.

Clause 8: The method of clause 6 or 7 further comprising: determining, based on the authenticating, that the client data retrieved from the current optimal cloud storage service is potentially invalid; determining, based on the analyzing the second ledger, a next optimal cloud storage service of the one or more acceptable cloud storage services; retrieving, from the next optimal cloud storage service, the client data based on the indication of the location for the client data; and outputting for transmission the client data retrieved from the next optimal cloud storage service to the second client device.

Clause 9: The method of any of clauses 2-8, wherein the first client device and the second client device are distinct client devices.

Clause 10: The method of any of clauses 2-9, wherein a third ledger comprises an access log of the client data, and the method further comprises updating the access log to include the request from the second client device.

Clause 11: The method of any of clauses 2-10, wherein the request to access the client data indicates a type of service request, and determining the current optimal cloud storage service is based on the type of service request.

Clause 12: The method of any of clauses 2-11 further comprising: receiving, from the second client device, an indication to persist changes to the client data; and updating the one or more acceptable cloud storage services to reflect the changes to the client data.

Clause 13: The method of any of clauses 2-12 further comprising authenticating the second client device.

Clause 14: The method of any of clauses 1-13, wherein the first ledger comprises client preferences for cloud storage service acceptability.

Clause 15: The method of any clause 14, wherein the client preferences comprises at least one from among cost sensitivity, access speeds, data security, latency requirements, time-of-day requirements, service type, and service reliability.

Clause 16: The method of any of clauses 1-15, wherein uploading the client data comprises separating the client data into a plurality of data blocks, and uploading the plurality of data blocks to the one or more acceptable cloud storage services.

Clause 17: The method of clause 16 further comprising uploading, to each of the one or more acceptable cloud storage services, a subset of the plurality of data blocks.

Clause 18: The method of clauses 16 or 17 further comprising: receiving, from a second client device, a request to access the client data; analyzing a second ledger to determine one or more current optimal cloud storage services of the one or more acceptable cloud storage services; retrieving, from the one or more current optimal cloud storage service, the plurality of data blocks based on the indication of the location for the client data; and outputting for transmission the client data to the second client device.

Clause 19: The method of any of clause 18, wherein retrieving the plurality of data blocks comprises retrieving, from each of at least two of the one or more current optimal cloud storage services, at least one data block of the plurality of data blocks.

Clause 20: The method of clauses 18 or 19 further comprising rejoining the retrieved data blocks to recompile the client data.

Clause 21: The method of any of clauses 1-20, wherein at least one of the one or more acceptable cloud storage services comprises a cloud service maintained by an organization associated with the first client device.

Clause 22: The method of any of clauses 1-21, wherein the client data is received from the first client device having a primary encryption.

Clause 23: The method of any of clauses 1-22 further comprising performing secondary encryption to the client data before uploading the client data to the one or more acceptable cloud storage services.

Clause 24: The method of any of clauses 1-23, wherein the first ledger comprises a private blockchain ledger.

Clause 25. A data manager comprising: at least one processor; and at least one memory having stored thereon instructions that, when executed by the at least one processor, controls the at least one processor to execute the method of any of clauses 1-24.

Clause 26. A non-transitory computer readable medium having stored thereon instructions for implementing the method of any of clauses 1-24.

Clause 27. A system comprising: at least one processor; and at least one memory having stored thereon instructions that, when executed by the at least one processor, controls the at least one processor to execute the method of any of clauses 1-24.

While certain example embodiments of the disclosed technology have been described above, it is to be understood that the disclosed technology is not to be limited to the disclosed embodiments, but on the contrary, is intended to cover various modifications and equivalent arrangements included within the scope of the appended claims and their equivalents. Although specific terms are employed herein, they are used in a generic and descriptive sense only and not for purposes of limitation. It is intended that each term contemplates its broadest meaning as understood by those skilled in the art and includes all technical equivalents that operate in a similar manner to accomplish a similar purpose.

In the above description, numerous specific details are set forth. However, it is to be understood that some embodiments of the disclosed technology may be practiced without these specific details. In other instances, well-known methods, structures, and techniques have not been shown in detail in order to avoid obscuring an understanding of this description. References to "one embodiment," "an embodiment," "example embodiment," "some embodiments," "certain embodiments," "various embodiments," etc., indicate that the example embodiment(s) of the disclosed technology so described may include a particular feature, structure, or characteristic, but not that every embodiment necessarily includes the particular feature, structure, or characteristic. Further, repeated use of the phrase "in one embodiment" does not necessarily refer to the same embodiment, although it may.

Unless otherwise noted, the terms used herein are to be understood according to conventional usage by those of ordinary skill in the relevant art. In addition to any provided definitions of terms, it is to be understood that as used in the specification and in the claims, the term "or" is intended to mean an inclusive "or." Further, the terms "a," "an," and "the" are intended to mean one or more unless specified otherwise or clear from the context to be exclusively directed to a singular form.

Unless otherwise specified, the use of the ordinal adjectives "first," "second," "third," etc., to describe a common object, merely indicates that different instances of like objects are being referred to, and are not intended to imply that the objects so described must be in a given sequence, either temporally, spatially, in ranking, or in any other manner.

The materials described herein as making up the various elements of some example embodiments are intended to be illustrative only and not restrictive. Many suitable materials that would perform a same or a similar function as the materials described herein are intended to be embraced within the scope of the present disclosure. Such other materials not described herein can include, but are not limited to, materials that are developed after the time of the development of the invention.

This written description uses examples to disclose certain example embodiments of the disclosed technology, including the best mode, and also to enable any person skilled in the art to practice certain embodiments of the disclosed technology, including making and using any devices or systems and performing any incorporated methods. The scope of certain embodiments of the disclosed technology is defined in the claims and their equivalents, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A cloud data management method comprising:
receiving, from a first client device, client data for cloud storage;
analyzing a first ledger to determine one or more acceptable cloud storage services from a plurality of cloud storage services;
uploading, to the one or more acceptable cloud storage services, the client data;
updating the first ledger to include an indication of a location for the client data at the one or more acceptable cloud storage services;
receiving, from a second client device, a request to access the client data;
analyzing a second ledger to determine a current optimal cloud storage service of the one or more acceptable cloud storage services;
retrieving, from the current optimal cloud storage service, the client data based on the indication of the location for the client data; and
outputting for transmission the client data to the second client device.

2. The method of claim 1 further comprising:
monitoring conditions of the one or more acceptable cloud storage services; and
updating the second ledger based on the monitored conditions,
wherein the monitored conditions comprise at least one of current pricing for the one or more acceptable cloud storage services, current availability of the one or more acceptable cloud storage services, and current throughput of the one or more acceptable cloud storage services.

3. The method of claim 2 further comprising:
receiving, from a third client device, a new request to access the client data;
analyzing the second ledger updated based on the monitored conditions to determine a new current optimal cloud storage service of the one or more acceptable cloud storage services;
retrieving, from the new current optimal cloud storage service, the client data based on the indication of the location for the client data; and
outputting for transmission the client data to the third client device.

4. The method of claim 1 further comprising:
hashing the client data received from the first client device to create a client data hash;
storing the client data hash; and
authenticating, prior to outputting the client data for transmission, the client data retrieved from the current optimal cloud storage service by:
hashing the client data retrieved from the current optimal cloud storage service to create a retrieved data hash; and
comparing the retrieved data hash to the client data hash.

5. The method of claim 4 further comprising:
determining, based on the authenticating, that the client data retrieved from the current optimal cloud storage service is potentially invalid;
determining, based on the analyzing the second ledger, a next optimal cloud storage service of the one or more acceptable cloud storage services;
retrieving, from the next optimal cloud storage service, the client data based on the indication of the location for the client data; and
outputting for transmission the client data retrieved from the next optimal cloud storage service to the second client device.

6. The method of claim 1, wherein
the request to access the client data indicates a type of service request, and
determining the current optimal cloud storage service is based on the type of service request.

7. The method of claim 1 further comprising:
receiving, from the second client device, an indication to persist changes to the client data; and
updating the one or more acceptable cloud storage services to reflect the changes to the client data.

8. The method of claim 1, wherein the first ledger comprises client preferences for cloud storage service acceptability, the client preferences comprising at least one from among cost sensitivity, access speeds, data security, latency requirements, time-of-day requirements, service type, and service reliability.

9. The method of claim 1, wherein uploading the client data comprises separating the client data into a plurality of data blocks, and uploading the plurality of data blocks to the one or more acceptable cloud storage services.

10. The method of claim 9 further comprising uploading, to each of the one or more acceptable cloud storage services, a subset of the plurality of data blocks.

11. The method of claim 9 further comprising:
receiving, from a third client device, a request to access the client data;
analyzing the second ledger to determine one or more current optimal cloud storage services of the one or more acceptable cloud storage services;
retrieving, from each of at least two of the one or more current optimal cloud storage services, at least one data block of the plurality of data blocks to retrieve the plurality of data blocks based on the indication of the location for the client data; and
outputting for transmission the client data to the third client device.

12. The method of claim 1, wherein
the client data is received from the first client device having a primary encryption, and
the method further comprises performing secondary encryption to the client data before uploading the client data to the one or more acceptable cloud storage services.

13. A data manager comprising:
at least one processor; and
at least one memory having stored thereon instructions that, when executed by the at least one processor, controls the at least one processor to:
receive, from a first client device, client data for cloud storage;

analyze a first ledger to determine one or more acceptable cloud storage services from a plurality of cloud storage services;

upload, to the one or more acceptable cloud storage services, the client data;

update the first ledger to include an indication of a location for the client data at the one or more acceptable cloud storage services;

receive, from a second client device, a request to access the client data;

analyze a second ledger to determine a current optimal cloud storage service of the one or more acceptable cloud storage services;

retrieve, from the current optimal cloud storage service, the client data based on the indication of the location for the client data; and output for transmission the client data to the second client device.

14. The data manager of claim 13, wherein the instructions, when executed by the at least one processor, further controls the at least one processor to:

monitor conditions of the one or more acceptable cloud storage services;

update the second ledger based on the monitored conditions; and retrieve client data in accordance with subsequent requests based on the updated second ledger, wherein the monitored conditions comprise at least one of current pricing for the one or more acceptable cloud storage services, current availability of the one or more acceptable cloud storage services, and current throughput of the one or more acceptable cloud storage services.

15. The data manager of claim 13, wherein the instructions, when executed by the at least one processor, further controls the at least one processor to:

hash the client data received from the first client device to create a client data hash;

store the client data hash; and authenticate, prior to outputting the client data for transmission, the client data retrieved from the current optimal cloud storage service by:

hashing the client data retrieved from the current optimal cloud storage service to create a retrieved data hash; and comparing the retrieved data hash to the client data hash.

16. The data manager of claim 15, wherein the instructions, when executed by the at least one processor, further controls the at least one processor to:

determine, based on the authentication, that the client data retrieved from the current optimal cloud storage service is potentially invalid;

determine, based on analyzing the second ledger, a next optimal cloud storage service of the one or more acceptable cloud storage services;

retrieve, from the next optimal cloud storage service, the client data based on the indication of the location for the client data; and output for transmission the client data retrieved from the next optimal cloud storage service to the second client device.

17. The data manager of claim 13, wherein the instructions, when executed by the at least one processor, further controls the at least one processor to:

separate the client data into a plurality of data blocks;

upload the plurality of data blocks to the one or more acceptable cloud storage services;

receive, from a third client device, a request to access the client data;

analyze the second ledger to determine one or more current optimal cloud storage services of the one or more acceptable cloud storage services;

retrieve, from each of at least two of the one or more current optimal cloud storage services, at least one data block of the plurality of data blocks to retrieve the plurality of data blocks based on the indication of the location for the client data; and output for transmission the client data to the third client device.

18. A cloud data management method comprising:

receiving, from a first client device, client data for cloud storage;

analyzing a first ledger to determine one or more acceptable cloud storage services from a plurality of cloud storage services;

separating the client data into a plurality of data blocks;

uploading, to the one or more acceptable cloud storage services, the client data by uploading the plurality of data blocks to the one or more acceptable cloud storage services;

updating the first ledger to include an indication of a location for the client data at the one or more acceptable cloud storage services;

receiving, from a second client device, a request to access the client data;

analyzing a second ledger to determine one or more current optimal cloud storage services of the one or more acceptable cloud storage services;

retrieving, from each of at least two of the one or more current optimal cloud storage services, at least one data block of the plurality of data blocks to retrieve the plurality of data blocks based on the indication of the location for the client data; and outputting for transmission the client data to the second client device.

19. The method of claim 18, further comprising: uploading, to each of the one or more acceptable cloud storage services, a subset of the plurality of data blocks.

20. The method of claim 18, further comprising:

monitoring conditions of the one or more acceptable cloud storage services; and updating the second ledger based on the monitored conditions, wherein the monitored conditions comprise at least one of current pricing for the one or more acceptable cloud storage services, current availability of the one or more acceptable cloud storage services, and current throughput of the one or more acceptable cloud storage services.

* * * * *